(12) United States Patent
Martinez et al.

(10) Patent No.: US 7,172,696 B1
(45) Date of Patent: Feb. 6, 2007

(54) RADIAL DISPERSION MASS TRANSFER DEVICE HAVING A SEMI-PERMEABLE TUBULAR HOLLOW FIBER MEMBRANE WOUND AROUND A POROUS CORE

(75) Inventors: Jesus Martinez, Mission Viejo, CA (US); Virginia Thanh Ta, Santa Ana, CA (US)

(73) Assignee: Spectrum Laboratories, Inc., Rancho Dominguez, CA (US)

( * ) Notice: Subject to any disclaimer, the term of this patent is extended or adjusted under 35 U.S.C. 154(b) by 433 days.

(21) Appl. No.: 10/749,847

(22) Filed: Jan. 2, 2004

(51) Int. Cl.
| | |
|---|---|
| B01D 63/00 | (2006.01) |
| B01D 53/22 | (2006.01) |
| C02F 1/44 | (2006.01) |
| B01D 15/00 | (2006.01) |

(52) U.S. Cl. .......................... 210/321.81; 210/321.87; 210/321.8; 210/321.9; 96/4; 96/6; 96/10
(58) Field of Classification Search ............. 210/321.8, 210/321.88, 321.89, 500.23, 32.89, 497.1, 210/321.87, 321.6, 321.72, 321.78, 321.79, 210/321.81, 321.91, 640; 156/172; 96/6, 96/10, 4
See application file for complete search history.

(56) References Cited

U.S. PATENT DOCUMENTS

| | | | | |
|---|---|---|---|---|
| 3,794,468 | A | | 2/1974 | Leonard ..................... 23/258.5 |
| 4,021,351 | A | * | 5/1977 | Bray .......................... 210/232 |
| 4,045,851 | A | * | 9/1977 | Ashare et al. ........... 29/890.14 |
| 4,210,536 | A | * | 7/1980 | Coplan et al. ......... 210/321.88 |
| 4,572,446 | A | | 2/1986 | Leonard ..................... 242/7.02 |
| 4,824,566 | A | * | 4/1989 | Thibos .................. 210/321.87 |
| 4,880,440 | A | * | 11/1989 | Perrin .......................... 95/47 |
| 5,160,042 | A | * | 11/1992 | Bikson et al. ........... 210/321.8 |
| 5,299,749 | A | * | 4/1994 | Thorogood et al. ....... 242/437.3 |
| 5,362,361 | A | * | 11/1994 | Tatsumi ...................... 216/67 |
| 5,462,619 | A | * | 10/1995 | Haworth et al. ............ 156/172 |
| 5,538,642 | A | * | 7/1996 | Solie .......................... 210/652 |
| 5,897,729 | A | * | 4/1999 | Bikson et al. ............. 156/172 |
| 6,790,262 | B2 | * | 9/2004 | Sengupta et al. ................ 96/6 |

* cited by examiner

Primary Examiner—Ana M. Fortuna
(74) Attorney, Agent, or Firm—Edgar W. Averill, Jr.; Kenneth L. Green

(57) ABSTRACT

A mass transfer device having a fluid permeable core wound with many stands of a hollow fiber. A bulk fluid enters the interior of the core, passes through the side wall of the core, and along the outer surfaces of the hollow fibers. A baffle positioned in the center of the core so that the bulk fluid passes outwardly upstream of the baffle and inwardly through the core along the downstream of the block.

5 Claims, 4 Drawing Sheets

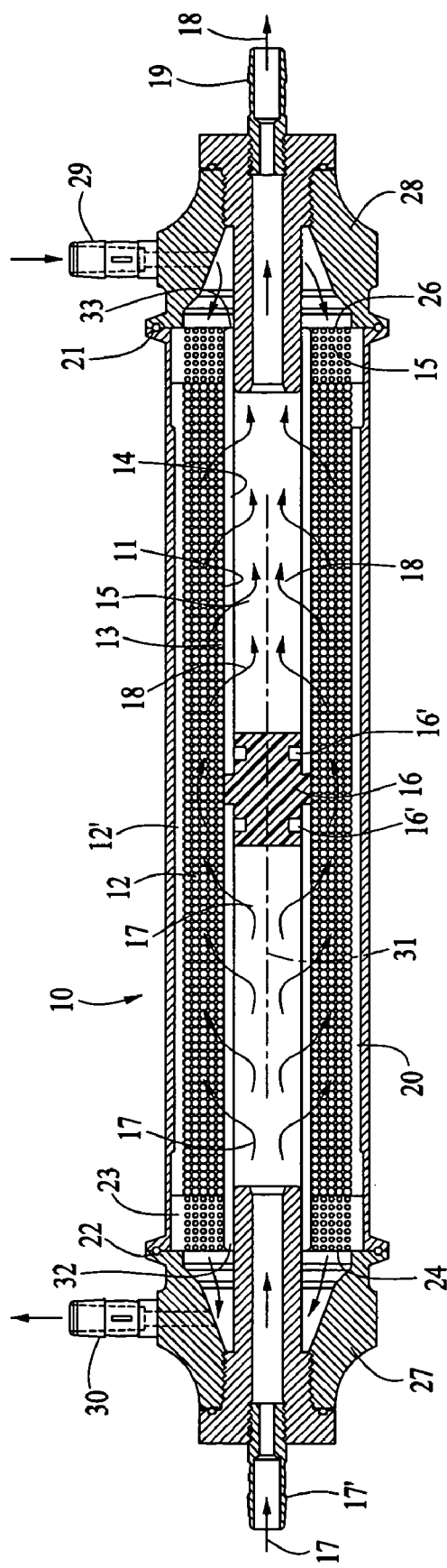

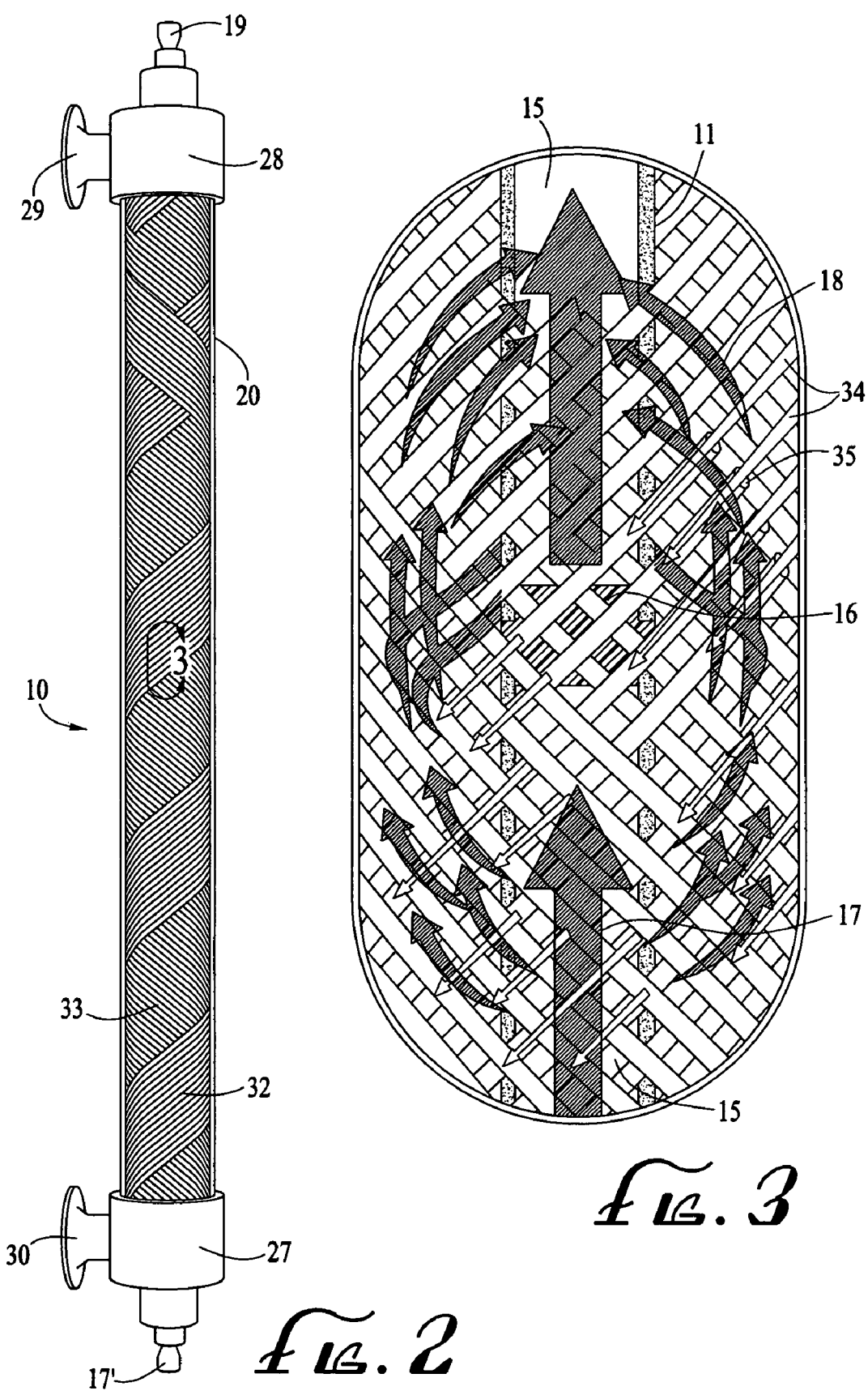

RADIAL DISPERSION MASS TRANSFER DEVICE HAVING A SEMI-PERMEABLE TUBULAR HOLLOW FIBER MEMBRANE WOUND AROUND A POROUS CORE

BACKGROUND OF THE INVENTION

The field of the invention is mass transfer devices and the invention relates more particularly to devices that are constructed to pass a bulk fluid along the exterior surface of a plurality of hollow fibers. One such device is shown in U.S. Pat. No. 3,794,468. A porous cylindrical core is wound with a single length of capillary tubing as the core is being turned. A core insert directs the bulk fluid from the interior of the porous core over the exterior of the capillary tubes and out of the outlet tubes. A second fluid passes counter currently through the interior of the capillary tubes.

Another process for making a fiber bundle is shown in U.S. Pat. No. 4,572,446. Again, a bundle of hollow fibers are wound around a length of a core.

A similar design is shown in U.S. Pat. No. 5,299,749. Continuous lengths of filament are laid down on a core around a length of a core.

The flow of fluid within the hollow fibers and the fluid flowing on the outside of the hollow fibers is almost counter current. For some separation processes, it is beneficial that the flow be more across the axis of the hollow fiber rather than along the axis of the hollow fiber.

BRIEF SUMMARY OF THE INVENTION

The present invention is for a mass transfer device having a fluid permeable core for the passage of a bulk fluid. The core has a bulk fluid inlet end and a bulk fluid outlet end. The core is surrounded by a bundle of hollow fibers. The core is fabricated from a sintered plastic or metal material having pores ranging in porosity from about 50 microns to about 200 microns. A baffle is positioned within the hollow center of the core so that fluid pumped into the inlet end of the core must pass outwardly through the walls of the core to get around the baffle. The fiber bundle is surrounded by a housing which forces the bulk fluid back into the side walls of the core downstream of the baffle. The fiber bundle is made from a first and a second plurality of semi permeable hollow fibers wound around the exterior of the core so that the first and second plurality of fibers form an angle between 20 and 60 degrees and preferably about 35 degrees with respect to one another.

BRIEF DESCRIPTION OF THE SEVERAL VIEWS OF THE DRAWING

FIG. 1 is a cross-sectional view of the mass transfer device of the present invention.

FIG. 2 is a side view with the facing side of the housing removed from the mass transfer device of FIG. 1.

FIG. 3 is an enlarged diagrammatical view taken along line 3—3 of FIG. 2.

DETAILED DESCRIPTION OF THE INVENTION

Figure 4:
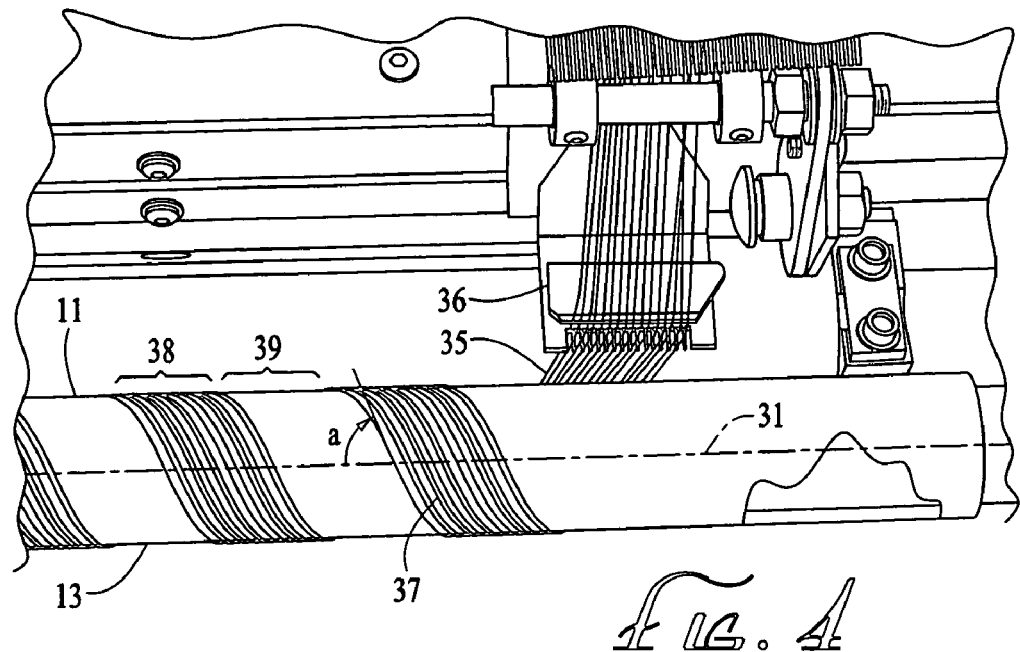
FIG. 4 is a side view showing the winding of hollow fibers around a core in the production of the mass transfer device of FIG. 1.

The mass transfer device of the present invention is indicated in cross-sectional view in FIG. 1 by reference character 10. Device 10 has a fluid permeable core 11. Hollow fiber bundle 12 is wrapped around exterior surface 13 of core 11. Core 11 has an inner surface 14 which surrounds an inner passageway 15. Permeable core 11 is in two halves and is joined by the ends of baffle 16. Baffle 16 is sealed to bore 11 by O-rings 16'.

A baffle 16 blocks the flow of fluid in inner passageway 15. Thus, bulk fluid entering the device, as indicated by reference character 17 through bulk fluid inlet fitting 17', must pass through the side walls of core 11, as indicated by arrows 17. Core 11 has a bulk fluid inlet end 32 and a bulk fluid outlet end 33. The fluid flow path 17 passes completely through fiber bundle 12 to an outer gap 12' between the outer edge of the bundle 12 and the inner surface of housing 20.

The details of the fluid passageway around the exterior of hollow fiber bundle 12 is shown best in FIG. 3 and discussed below. Broadly, however, bulk fluid passes back into interior passageway 15, as indicated by arrows 18, and leaves through bulk fluid outlet fitting 19.

Hollow fiber bundle 12 is surrounded by housing 20 which has a housing inlet end 21 and a housing outlet end 22.

Hollow fiber bundle 12 is subjected to the flow of bulk fluid around the exterior surfaces of the individual hollow fibers. A bore fluid flows through the interior of the hollow fiber bundle. This is accomplished by potting the ends of the bundle in a curable sealant 23 at a bore fluid exit end 24. Similarly, a curable sealant 25 is sealed around the bore fluid entrance end 26. A bore fluid exit manifold 27 surrounds the exterior open ends of the hollow fibers and a bore fluid entrance manifold 28 surrounds the open ends of the hollow fiber bundle 12. Thus, bore fluid enters the device through bore fluid entrance fitting 29 and exits the device through bore fluid exit fitting 30. The device and the core have a longitudinal axis indicated by reference character 31.

The mass transfer device 10 is shown in side view in FIG. 2 with the housing 20 cut away. Two sets of hollow fibers 32 and 33, one upwardly wound and one downwardly wound, are shown spaced apart a distance about equal to the width of one set. These are also indicated in FIG. 4 in an initial winding step discussed below.

An enlarged view of a portion of the fiber indicated by arrow 3 in FIG. 2 is shown in FIG. 3. In FIG. 3 the bulk fluid N is indicated by the shaded arrows 17. The bulk fluid passes into inner passageway 15. The bulk fluid 17 then passes outwardly through the side walls of the sintered fluid permeable core 11. It then passes across the outer surface of the hollow fiber bundle 12. This is shown in enlarged view in FIG. 3 where a hollow fiber is indicated by reference character 35. It then, having been forced around baffle 16, passes through the side walls of fluid permeable core 11 and continues to the bulk fluid outlet fitting 19. As can be seen in FIG. 3, the fluid tends to flow across the outer surface of the hollow fibers 35 more than it flows along parallel to the outer surfaces as generally taught by the prior art. It is believed that this provides a further anti-fouling scrubbing action of the bulk fluid against the outer surface of the fibers and helps the flow of a portion of bore fluid 34 through the walls of hollow fibers 35 and into the bulk fluid.

Figure 5:
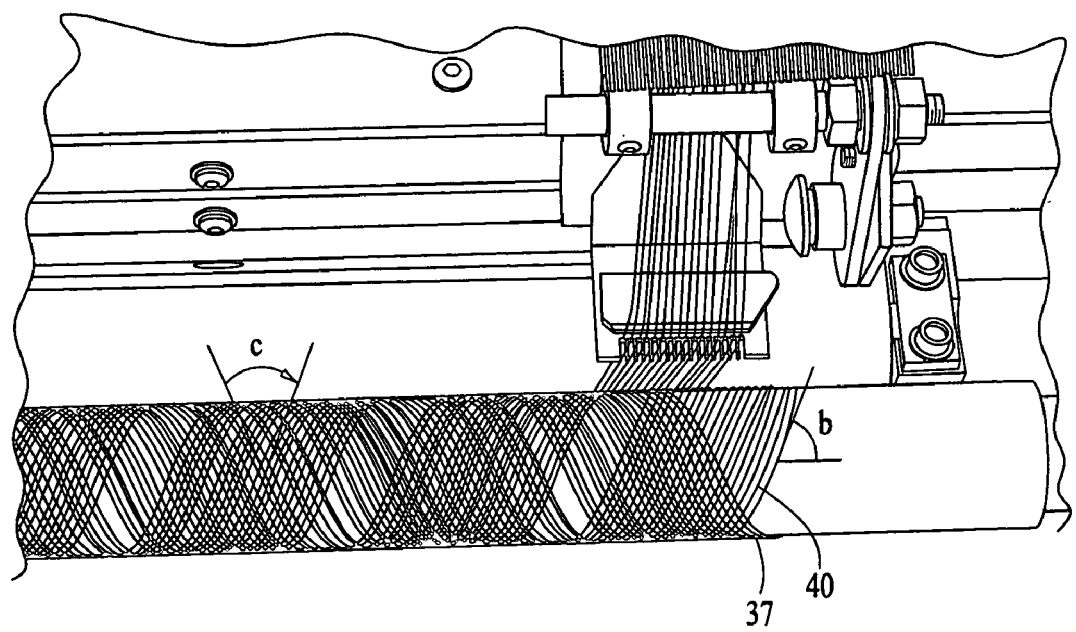
FIG. 5 is a view analogous to FIG. 4, but showing additional winding.

The winding process of the present invention is indicated in FIG. 4 where fiber feeding shuttle 36 can guide from 1 to 16 individual hollow fibers 35 in a set 37 of hollow fibers. Set 37 has a width 38. Each set 37 is spaced from an adjacent set by a space 39 which is preferably about equal to the width of a set. The set indicated in FIG. 4 is wound at an angle "a" to the longitudinal axis 31 of core 11. Then the winding process is reversed and a second set of hollow fibers is wound as indicated in FIG. 5. The second set is wound at an angle indicated by reference character b in FIG. 5. Angles a & b are arranged so that the angle between the set indicated by reference character 37 and the set indicated by reference character 40 are at an angle of about 35 degrees indicated by reference character "c". This angle can range between 20 and 60 degrees, but keeping this angle well below 180 degrees provides a crossflow rather than a longitudinal/tangential flow of the fluid passing within the hollow fibers and the bulk fluid passing over the exterior of the hollow fibers.

Figure 6:
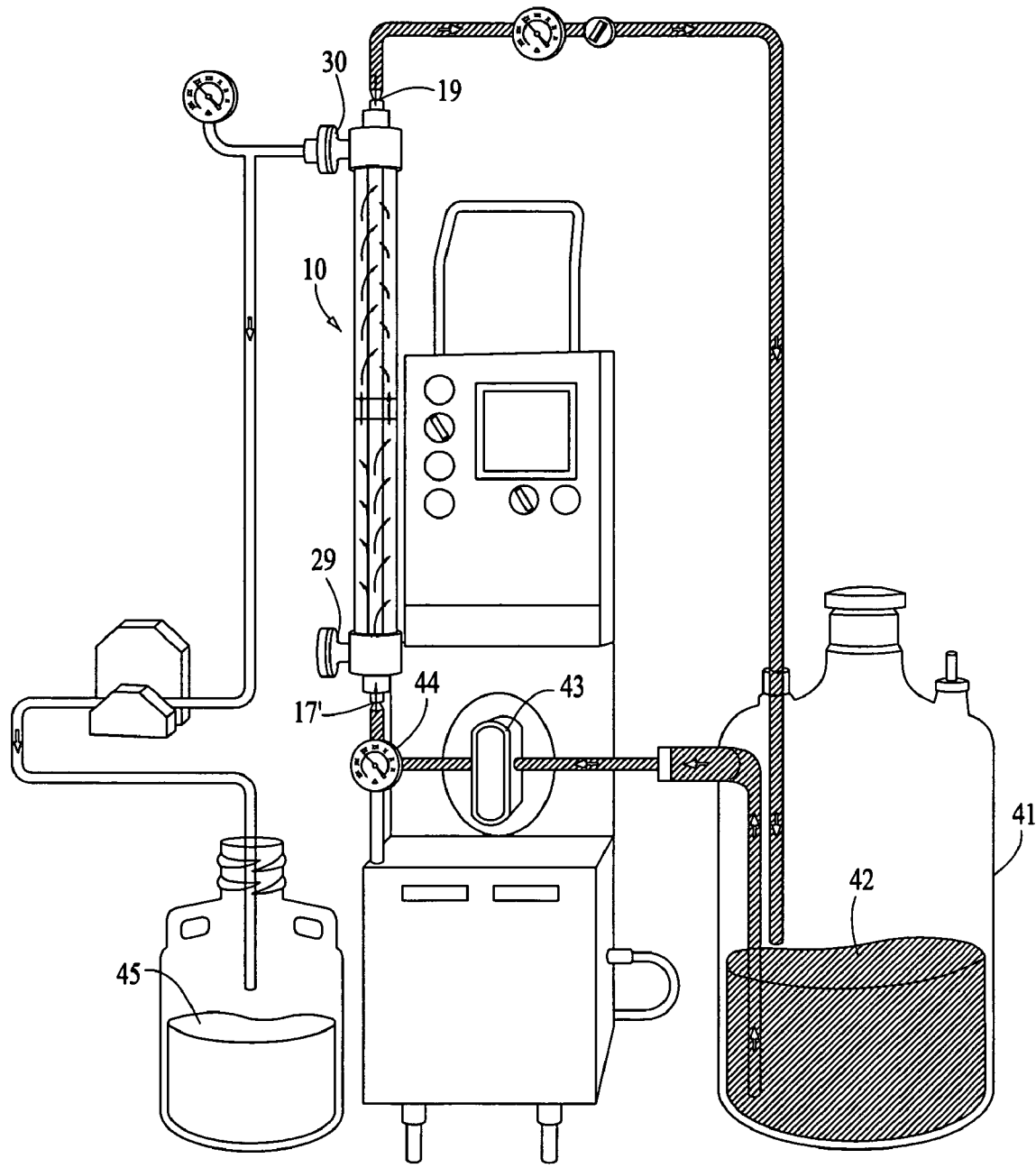
FIG. 6 is a diagrammatical view of the mass transfer device of FIG. 1 affixed to input and output streams.

A schematic view of a laboratory setup is shown in FIG. 6. A bulk fluid container 41 contains bulk fluid 42. This is passed through pump 43, pressure gauge 44, and into bulk fluid entrance fitting 17'. It passes upwardly through the mass transfer device 10 and out of bulk fluid exit fitting 19. While the bulk of the above discussion has indicated counter-current flow, the diagram of FIG. 6 depicts co-current flow. Thus, the bore fluid passes into inlet fitting 29 through the center of the hollow bores and hollow fibers 35 and out the bore fluid outlet fitting 30. The bore fluid is indicated by reference character 45.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A mass transfer device having a fluid permeable core for passage of a bulk fluid, said core having a bulk fluid inlet end, a bulk fluid outlet end, an inner surface surrounding an inner passageway and an exterior surface and having a longitudinal axis, said core having a plurality of windings of a tubular, semi-permeable membrane wrapped around said exterior surface of said core said windings forming a fiber bundle having a bore fluid inlet end and a bore fluid outlet end wherein the improvement comprises:

said fluid permeable core being fabricated from a sintered plastic or metal material having pores ranging in size from about 50 microns to about 200 microns, and said core having a baffle positioned against said inner surface interrupting said inner passageway so that all bulk fluid entering said inlet end must exit said inner passageway, pass outwardly through said pores on a feed side of said baffle to the exterior surface of said core and then flow inwardly through said pores below to an outflow side of said baffle from the exterior surface to said inner passageway;

a first plurality of parallel, semi-permeable hollow fibers wound around the exterior of said core at an acute angle facing said bulk fluid outlet end of between about 30 and 60 degrees with respect to the longitudinal axis of said core;

a second plurality of parallel, semi-permeable hollow fibers wound around the exterior of said core at an angle facing said bulk fluid inlet end of between about 30 and 60 degrees with respect to the longitudinal axis of said core, said first and second plurality of parallel, semi-permeable hollow fibers forming a hollow fiber bundle and said bundle being potted at an inlet end and at an outlet end of said hollow fiber bundle and transversely cut to provide a bore fluid inlet end and a bore fluid outlet end and a bore fluid passageway comprising a plurality of hollow bore passageways;

an impermeable housing surrounding said hollow fiber bundle extending between an inlet end of said housing at said hollow fiber bundle inlet and an exit end of said housing at said hollow fiber bundle outlet end;

a bore fluid entrance manifold having a bore fluid entrance fitting affixed to said inlet end of said housing and a bore fluid outlet manifold having a bore fluid outlet fitting affixed to said outlet end of said housing;

a bulk fluid inlet fitting affixed to said bulk fluid inlet end of said core; and a bulk fluid outlet fitting affixed to said bulk fluid outlet end of said core whereby a bulk fluid may be passed into said bulk fluid inlet fitting, pass into said inner passageway of said core, pass outwardly through said fluid permeable core upstream of said baffle, pass over the exterior of said hollow fiber bundle, pass inwardly through said fluid permeable core downstream of said baffle and out of said bulk fluid outlet fitting while bore fluid passes into said bore fluid inlet fitting, through the bore fluid passageways of said hollow fiber bundle and out of said bore fluid outlet fitting.

2. The mass transfer device of claim 1 wherein said core is fabricated from materials from the group consisting essentially of sintered polyethylene beads, polypropylene beads, and metal beads.

3. The mass transfer device of claim 1 wherein said hollow fibers are fabricated from a polymer selected from the group consisting essentially of polyethylene, polypropylene, polysulfone, polyether, sulfone, polyvinylene diflouride.

4. The mass transfer device of claim 1 wherein said hollow fibers are wound about said core in single or multiple fibers along said core and wound so that each of the fibers are spaced from one another from ten microns to one hundred microns.

5. The mass transfer device of claim 1 wherein said first plurality of parallel, semi-permeable hollow fibers is wound at an angle of about 35 degrees with respect to said second plurality of parallel, semi-permeable hollow fibers.

* * * * *